US 12,269,416 B2

(12) United States Patent
Moeker et al.

(10) Patent No.: US 12,269,416 B2
(45) Date of Patent: Apr. 8, 2025

(54) BELT FITTING FOR A SAFETY BELT DEVICE

(71) Applicant: Volkswagen Aktiengesellschaft, Wolfsburg (DE)

(72) Inventors: Carsten Moeker, Ruehen (DE); Falk Lesser, Braunschweig (DE); Peter Schoenfisch, Kloetze (DE); Peter Widel, Wolfsburg (DE); Ernst Glas, Isenbuettel (DE); Michael Otto, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 14 days.

(21) Appl. No.: 17/987,453

(22) Filed: Nov. 15, 2022

(65) Prior Publication Data

US 2023/0072757 A1 Mar. 9, 2023

Related U.S. Application Data

(63) Continuation of application No. PCT/EP2021/062404, filed on May 11, 2021.

(30) Foreign Application Priority Data

May 15, 2020 (DE) ............ 10 2020 206 133.5

(51) Int. Cl.
*A44B 11/25* (2006.01)
*B60R 22/12* (2006.01)
*B60R 22/18* (2006.01)

(52) U.S. Cl.
CPC .......... *B60R 22/18* (2013.01); *A44B 11/2557* (2013.01); *B60R 22/12* (2013.01); *B60R 2022/1812* (2013.01)

(58) Field of Classification Search
CPC ............ A44B 11/2546; A44B 11/2553; A44B 11/2561; A44B 11/2557; B60R 22/12; B60R 22/18
See application file for complete search history.

(56) References Cited

U.S. PATENT DOCUMENTS

| 4,023,826 A | * | 5/1977 | Kokubo | ................. B60R 22/30 |
| | | | | 297/483 |
| 4,278,043 A | * | 7/1981 | Heath | ..................... B60R 22/18 |
| | | | | 116/28 R |

(Continued)

FOREIGN PATENT DOCUMENTS

| DE | 29915058 U1 | 12/1999 |
| DE | 10112853 A1 | 10/2002 |

(Continued)

OTHER PUBLICATIONS

English Translation of SE-448270-B as provided by Clarivate (Year: 2024).*

*Primary Examiner* — Robert Sandy
*Assistant Examiner* — Michael S Lee
(74) *Attorney, Agent, or Firm* — Muncy, Geissler, Olds & Lowe, P.C.

(57) ABSTRACT

A belt fitting for a safety belt device, having a base section and a latch plate projecting from same. The base section has a belt eyelet with a belt strap running surface, which is in sliding contact with a belt strap guided through the belt eyelet when the safety belt is being worn, wherein, in the transverse direction of the belt strap, the belt strap running surface transitions on both sides at lateral corner regions into a belt eyelet edge opposite the belt strap running surface. The belt strap running surface has a surface contour which provides stable transverse guidance of the belt strap in the belt eyelet under loading conditions, which counteracts a transverse load component acting on the belt strap. A (Continued)

displacement body is formed on the belt eyelet edge-opposite the belt strap running surface, which reduces a gap width of the belt eyelet.

15 Claims, 8 Drawing Sheets

(56) References Cited

U.S. PATENT DOCUMENTS

| | | | |
|---|---|---|---|
| 5,984,358 A * | 11/1999 | Mar | A44B 11/2561 |
| | | | 280/808 |
| 6,565,121 B2 | 5/2003 | Knych et al. | |
| 9,623,837 B2 | 4/2017 | Moeker et al. | |
| 9,821,757 B2 * | 11/2017 | Moeker | A44B 11/2561 |
| 11,142,161 B2 | 10/2021 | Clauss et al. | |
| 2007/0138783 A1 * | 6/2007 | Gleason | B60R 22/24 |
| | | | 297/483 |
| 2013/0154335 A1 | 6/2013 | Tabata et al. | |
| 2018/0220749 A1 * | 8/2018 | Kato | A44B 11/2561 |

FOREIGN PATENT DOCUMENTS

| | | | | |
|---|---|---|---|---|
| DE | 10361226 A1 | 7/2005 | | |
| DE | 102012022278 A1 | 5/2014 | | |
| DE | 102016205068 A1 | 6/2016 | | |
| SE | 448270 B * | 2/1987 | | A44B 11/2557 |
| WO | WO2015022214 A1 | 2/2015 | | |
| WO | WO2015070970 A1 | 5/2015 | | |

* cited by examiner

BELT FITTING FOR A SAFETY BELT DEVICE

This nonprovisional application is a continuation of International Application No. PCT/EP2021/062404, which was filed on May 11, 2021, and which claims priority to German Patent Application No. 10 2020 206 133.5, which was filed in Germany on May 15, 2020, and which are both herein incorporated by reference.

BACKGROUND OF THE INVENTION

Field of the Invention

The present invention relates to a belt fitting for a safety belt device in a vehicle.

Description of the Background Art

A safety belt device of a vehicle may have, by way of example, a lap belt section and a shoulder belt section running diagonally across the upper body of the vehicle occupant. When the safety belt is attached, the lap belt section is anchored to the vehicle body via two laterally opposite, lower connection points. Usually, the connection point positioned inside in the vehicle transverse direction is detachable, namely with a belt fitting provided on the lap belt, the latch plate of which can be inserted into a belt buckle anchored to the vehicle body.

From WO 2015/022214 A1, which corresponds to US 2016/0159315, which is incorporated herein by reference, a generic belt fitting is known. This has a base section and a latch plate projecting from the same. The base section is formed with a belt eyelet with a belt strap running surface. When the safety belt is being worn, the belt strap running surface is in sliding contact with a belt strap guided through the belt eyelet. In order to provide stable belt strap transverse guidance in the belt eyelet under loading conditions, the belt strap running surface has a correspondingly realized surface contour. The belt strap running surface also transitions, in the belt strap transverse direction, on both sides at lateral rounded corner regions into a belt eyelet edge opposite the belt strap running surface.

Under loading conditions, depending on the crash situation, an excessively large belt force can act on the fastened safety belt. In this case, in a conventional belt fitting, there may be a transverse displacement of the belt strap to the corner area of the belt eyelet in the belt strap running surface. This results in a very strong rolling stress of the belt strap material in the belt eyelet corner region. The resulting friction energy may deform a plastic overmolding (for example made of PP or PA) on the belt eyelet corner region or the belt strap filaments of the belt strap.

SUMMARY OF THE INVENTION

It is therefore an object of the present invention to provide a belt fitting that ensures perfect operational safety under loading conditions as compared to the conventional art.

According to an exemplary embodiment, a displacement body can be formed on the belt strap eyelet edge opposite the belt strap running surface, with which a belt eyelet cross-section is reducible. The displacement body acts as a spacer for a defined belt eyelet slot height to prevent the belt from folding. For this purpose, the displacement body projects into the belt eyelet, reducing the belt eyelet slot height. The displacement body is spaced apart, in the belt strap transverse direction, on both sides by a free space from the respective rounded belt eyelet corner region. In the event of a transverse displacement of the belt strap under loading conditions, its edge can be moved into the belt eyelet free space without interfering contours, which reduces a rolling load on the belt strap edge, so that damage to the belt strap due to increased friction energy can be avoided.

In a technical implementation, a belt strap guide gap comprising a reduced passage cross-section may be provided between the belt strap running surface and the displacement body which is formed on the opposite edge of the belt eyelet edge. The belt strap guide gap transitions, in the belt strap transverse direction, on both sides into the respective belt strap free space, which has an extended passage cross-section. The respective lateral belt strap free space can be pulled up by a profile height from the belt strap guide gap in the direction of the latch plate.

The surface contour of the belt strap running surface in the belt strap transverse direction can be concave. The concave surface contour may have a center contour bottom in the belt strap transverse direction, on which contour flanks are pulled up to a tread edge on both sides. The contour bottom can be recessed by a contour depth with respect to the tread edge.

The surface contour of the belt strap running surface may be convex in the belt strap transverse direction. In this case, the convex surface contour in the belt strap transverse direction may have a center contour vertex at which, on both sides, contour flanks fall by a vertex height up to a tread edge. As an alternative to a convex or concave surface contour, this can also be designed as a straight line in the belt strap transverse direction.

In a technical realization, the belt strap running surface can be divided into a front belt strap outlet located on the front of the belt fitting and a rear belt strap outlet located on the back of the belt fitting. The two belt strap outlets can transition into each other on a rounded web surface.

In order to largely prevent a transverse displacement of the belt strap in the belt eyelet under loading conditions, it is preferred if the surface contour, alternatively and/or additionally, has a wave profile with a sinusoidal course in the belt strap transverse direction, in which the wave troughs are recessed by an amplitude height from the wave crests.

The tread width of the belt strap running surface is approximately in a range of 46 mm to 50 mm.

In a first example, the amplitude height of the wave profile can be 0.8 mm, while a wavelength can be 6.9 mm. In this case, the number of wave crests over the tread width can be a total of eight wave crests. In a second example, the amplitude height can be 1.0 mm, while the wavelength is 4.0 mm. In this case, a total of about 13 wave crests can form over the tread width. In another example, the amplitude height can be 0.5 mm, while the wavelength is 2.0 mm. In this case, a total of 25 wave crests can result over the tread width.

The surface contour may have a grooved profile formed in the belt strap running surface, in which longitudinal grooves are incorporated into the belt strap running surface. These can be spaced apart in the belt strap transverse direction via longitudinal ribs. In normal driving mode, the belt strap may be in sliding contact with the belt strap running surface when the safety belt is being worn, while the grooved bottoms are each out of contact with the belt strap. Only under loading conditions can the belt strap shift into the grooves, which provides contact between the belt strap and the respective groove bottom.

Each of the longitudinal grooves can have a grooved bottom recessed by a groove depth from the belt strap running surface, from which side flanks are pulled up, which transition into the belt strap running surface on, in particular, rounded transition edges. In a first embodiment, the groove depth can be 1.0 mm, while a groove width can be 2.5 mm. The rib width can be 2.0 mm. The groove depth and the groove width are designed in such a way that belt strap damage can be avoided.

The longitudinal rib width can be 2.0 mm or 3.0 mm, while the longitudinal groove width can be 3.5 mm and the groove depth can be 2.0 mm. In this case, there may be a total of seven longitudinal ribs spaced apart from each other across the tread width. In a third example, the groove width can be 11.0 mm, while the groove depth can be 1.8 mm. The rib width can be in a range between 3.0 mm and 4.5 mm. In this case, there are a total of two longitudinal ribs spaced apart from each other in the belt strap running surface spread over its tread width.

The belt fitting can be made of at least one metal body and a plastic overmolding (hybrid design). In this case, the grooved bottom of the respective longitudinal groove of the groove profile may preferably be provided by the metal body to reduce the surface roughness of the grooved bottom. On the other hand, the respective longitudinal rib can be made of plastic material, which has an increased surface roughness as compared to the grooved bottom.

The grooved bottom of the respective longitudinal groove can be smooth-surfaced or alternatively formed with nubs. These can protrude from the grooved bottom by a nub height. The nub height may preferably be smaller than the groove depth.

In a further development of the invention, the grooved bottom of the respective longitudinal groove of the ribbed profile may have a coefficient of friction greater than the coefficient of friction of the respective longitudinal rib. In this case, under loading conditions, an increased adhesive friction occurs between the belt strap and the groove bottom, so that the belt strap is not moved in the transverse direction under loading conditions.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
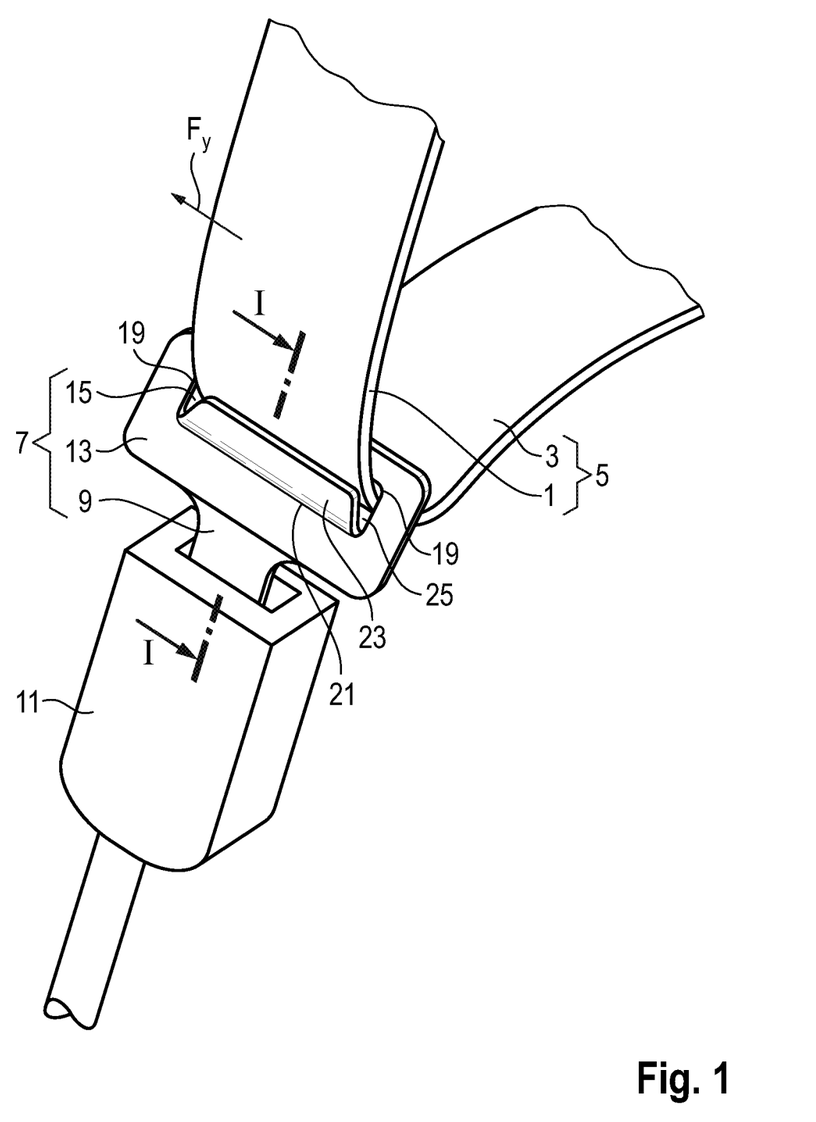
FIG. 1 is a cut-out of a three-point safety belt device in a position of use in which the safety belt is fastened on the vehicle occupant.

In FIG. 1, the three-point safety belt device is shown in a position of use in which the safety belt 5 is fastened on the vehicle occupant. The safety belt 5 has a shoulder belt section 1 and a lap belt section 3, which transition into each other on a belt fitting 7. FIG. 1 does not show the driver's seat and the vehicle occupant for reasons of clarity. The upper end of the shoulder strap section 1, which is also not shown, may be connected to a retractor, not shown, which is arranged, for example, in the B-pillar. According to FIG. 1, the lap belt section 3 extends in the vehicle transverse direction y from an external connection point, not shown, to the belt fitting 7, which is plugged into a belt buckle 11 with its latch plate 9.

The belt fitting 7 is formed of a base section 13 and the latch plate 9. The base section 13 of the belt fitting 7 has a belt eyelet 15 with a belt strap running surface 17. When the safety belt 5 is fastened, this is in sliding contact with the belt strap guided through the belt eyelet 15.

Figure 2:
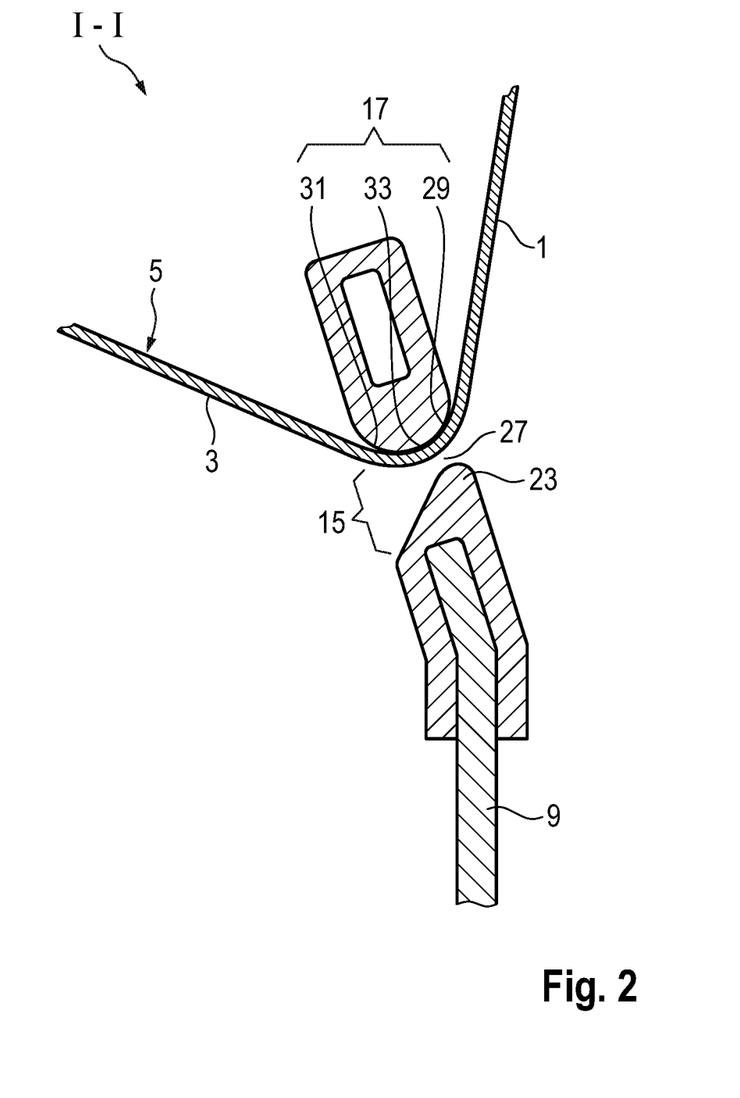
FIG. 2 is a view of the detachable belt fitting in a cutting plane I-I from FIG. 1.

In FIG. 2, the belt strap running surface 17 transitions, in the belt strap transverse direction, on both sides at a lateral rounded corner region 19 into a belt eyelet edge 21, which is opposite the belt strap running surface 17.

As can be seen from FIG. 1, a displacement body 23 is formed on the belt eyelet edge 21. This reduces a gap width of the belt eyelet 15. The displacement body 23 is spaced apart in the belt strap transverse direction on both sides via a belt strap free space 25 from the respective, rounded belt eyelet corner region 19. In this way, between the belt strap running surface 17 and the displacement body 23, a slot-shaped belt strap guide gap 27 (FIG. 2 or 3) with reduced passage cross-section is provided, which transitions, in the belt strap transverse direction, on both sides into the respective cross-sectional belt strap free space 25. The belt strap free space 25 is pulled up in FIG. 3 by a profile height h from the belt strap guide gap towards the latch plate 9.

As can be further seen from FIG. 2, the belt strap running surface 17 is divided into a front belt strap outlet 29 formed on the front of the belt fitting and a rear belt strap outlet 31 formed on the back of the belt fitting. The two belt strap outlets 29, 31 transition into each other on a rounded web surface 33.

Figure 3:
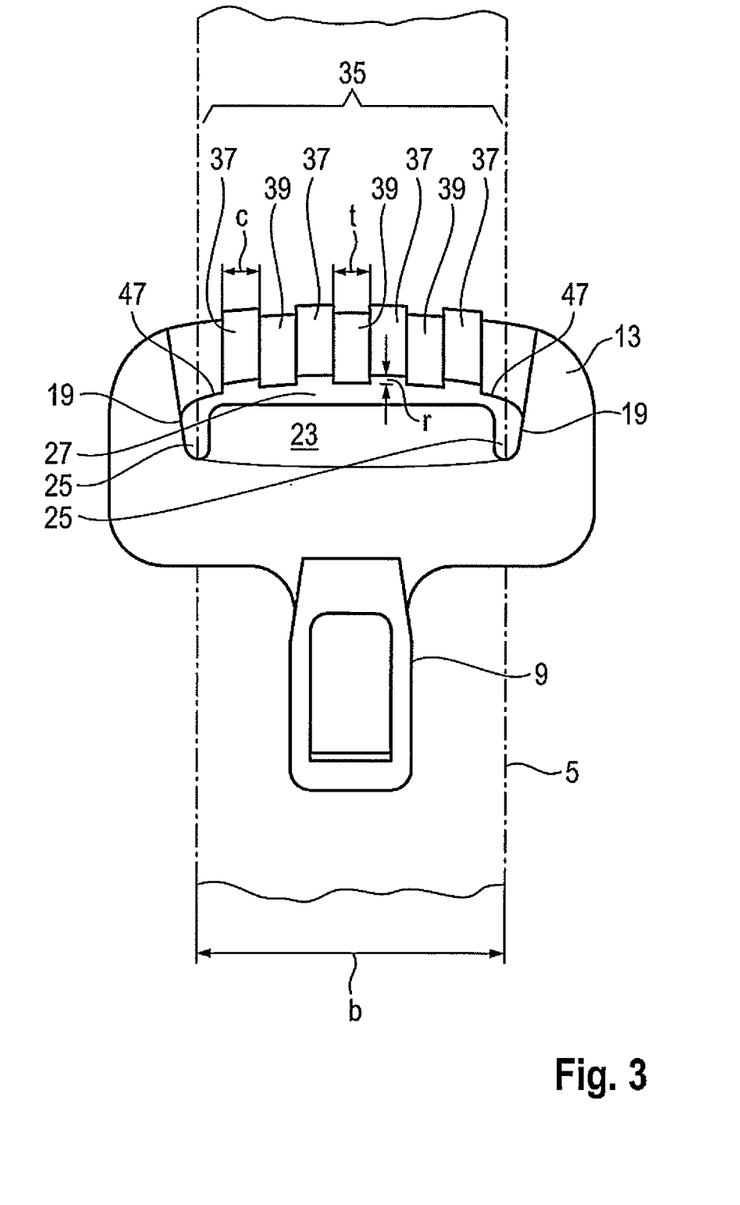
FIG. 3 is a side view of the belt fitting in isolation.

According to the invention, the belt strap running surface 17 in FIG. 3 has a surface contour 35, which under loading conditions provides a largely stable belt strap transverse guidance in the belt eyelet 15. With the help of the surface contour 35 of the belt strap running surface 17, a transverse load component $F_y$ acting on the belt strap (FIG. 1) is counteracted under loading conditions.

In the following, a particularly preferred embodiment variant of the surface contour 35 is described on the basis of FIG. 3: Accordingly, the surface contour 33 has a grooved profile formed in the belt strap running surface 17, in which a total of four longitudinal grooves 37 are incorporated into the belt strap running surface 17. The longitudinal grooves 37 are spaced apart from each other in the belt strap transverse direction via three longitudinal ribs 39. The tread width b in FIG. 3 is in a range between 46 mm and 50 mm. Each of the longitudinal grooves 37 has a grooved bottom 41 (FIG. 10b), which is recessed by a groove depth r from the belt strap running surface 17. The groove depth r is preferably 1.8 mm, while a rib width t is about 3.0 mm and the groove width c can be within a range of 11 mm.

According to FIG. 3, the belt strap running surface 17 interrupted by the longitudinal grooves 37 is overall concave, namely with a contour bottom 43 (FIG. 5) centered in the belt strap transverse direction, on which contour flanks 45 (FIG. 5) are pulled up on both sides up to a tread edge 47. The respective belt eyelet corner region 19 adjoins the tread edge 47. With respect to the lateral tread edge 47, in FIG. 2 the contour bottom 43 is recessed by a contour depth k (shown only in FIG. 5), which lies in a range between 0.1 and 0.2 mm. In this way, the passage cross-section of the belt strap guide gap 27 is largest in the belt fitting center, and this is reduced on both sides in the direction of the respective belt eyelet free spaces 25.

Figure 4:
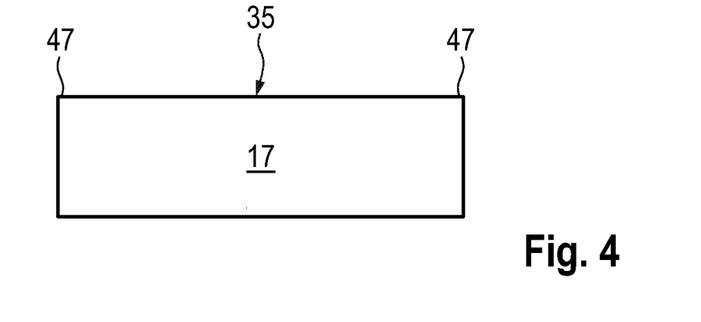
FIGS. 4 to 15 show different examples of the belt strap running surface of the belt fitting.
Figure 5:
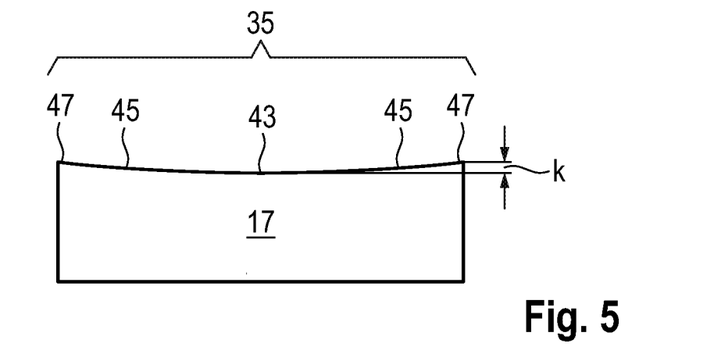

In the following, further embodiments of the surface contour 35 formed in the belt strap running surface 17 are shown on the basis of FIG. 4: Accordingly, in FIG. 4, the surface contour 35 of the belt strap running surface 17, in the belt strap transverse direction, is formed straight and smooth without additional longitudinal ribs. FIG. 5 shows a concave surface contour 35, in which a contour bottom 43 in the center of the belt strap transverse direction is pulled up on both sides over contour flanks 45 to a tread edge 47. The contour bottom 43 is recessed by the contour depth k with respect to the tread edge 47, which can be between 0.1 mm and 2 mm.

Figure 6:
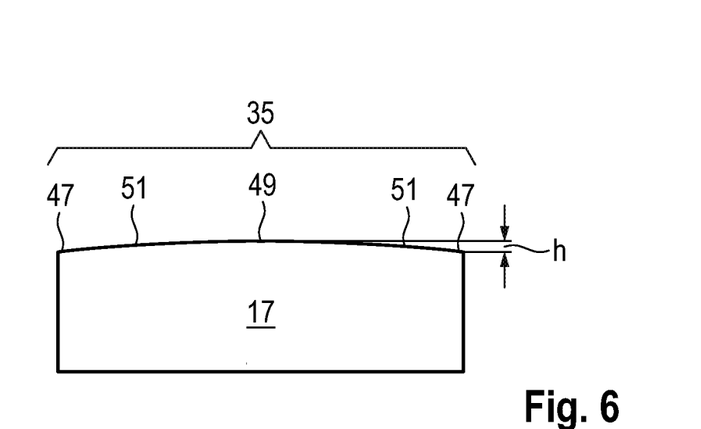

FIG. 6 shows a convex surface contour 35, which has a center contour vertex 49 in the belt strap transverse direction, on which contour flanks 51 on both sides fall by a vertex height h to the tread edge 47.

Figure 7A:
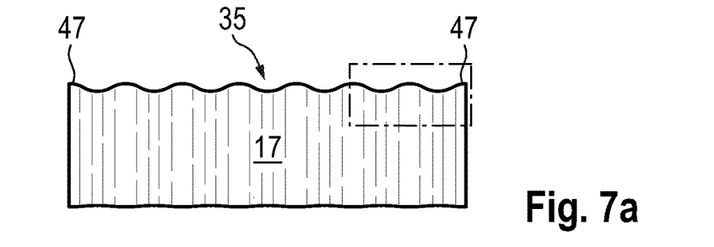
Figure 7B:
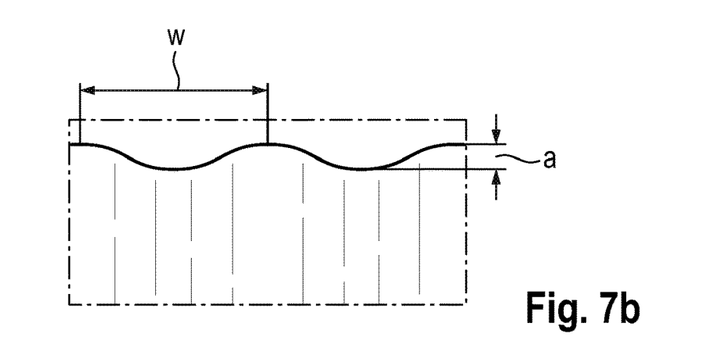

In FIG. 7, the surface contour 35 has a wave profile formed in the belt strap running surface 17 with a sinusoidal course in the belt strap transverse direction, in which the wave troughs are recessed by an amplitude height a from the wave crests. In FIG. 7, the amplitude height a is 0.8 mm. The wavelength w in FIG. 7 is 6.9 mm, so that a total of six wave crests result over the tread width b.

Figure 8A:
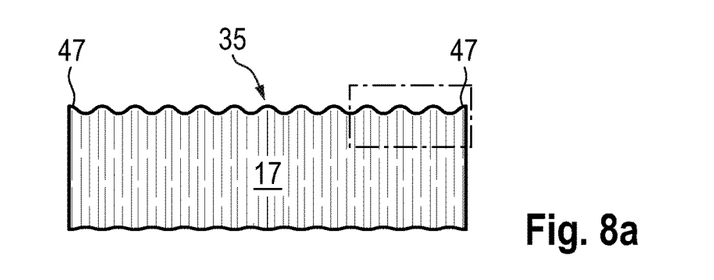
Figure 8B:
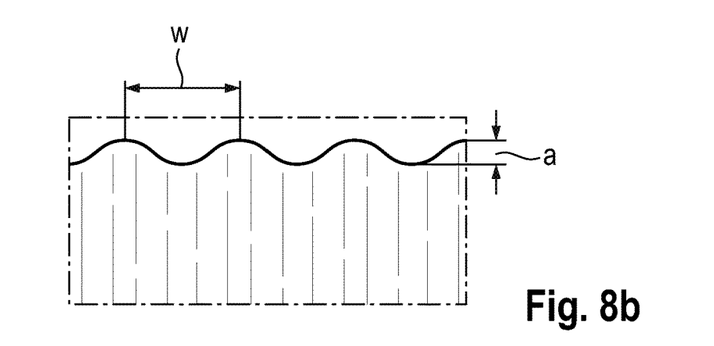

In FIG. 8, the amplitude height a of the wave profile is 1.0 mm, while the wavelength w is 4.0 mm. In this way, a total of eleven wave crests are created over the tread width between the two tread edges 47.

Figure 9A:
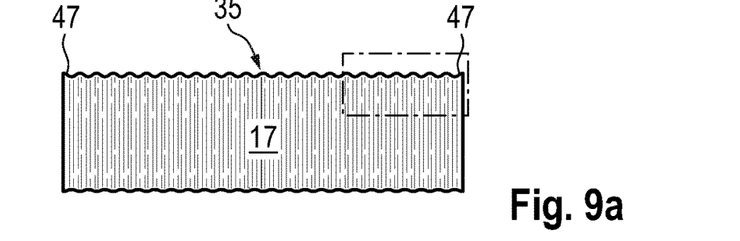
Figure 9B:
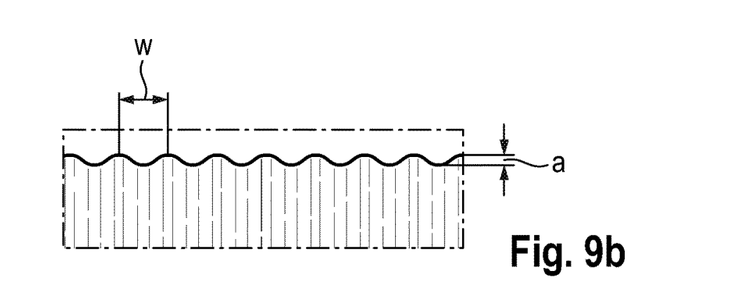

In FIG. 9, the amplitude height is 0.5 mm, while the wavelength w is 2.0 mm. In this way, in FIG. 9, a total of 23 wave crests are created between the two tread edges 47.

Figure 10A:
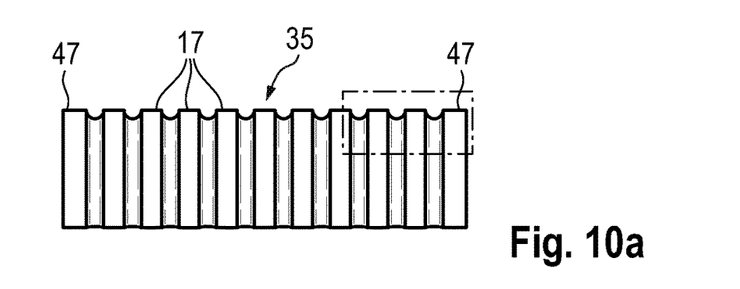
Figure 10B:
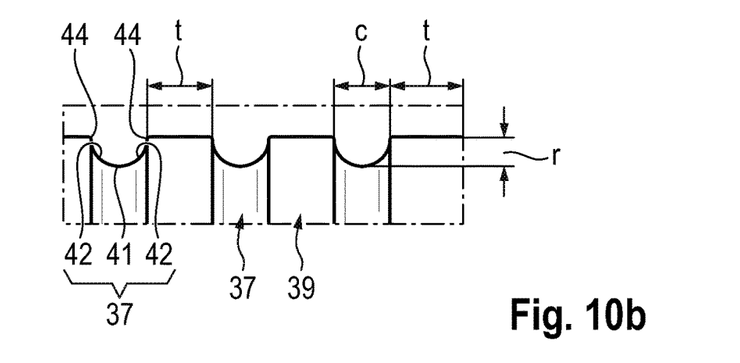

In FIG. 10, the surface contour 35 has a grooved profile formed in the belt strap running surface 17, in which 17 longitudinal grooves 37 are incorporated into the belt strap running surface. These are spaced apart from each other in the belt strap transverse direction via longitudinal ribs 39. Each longitudinal groove 37 has a groove bottom 41 recessed by one groove depth r from the belt strap running surface 17. From the grooved bottom 41, side flanks 42 are pulled up, which transition on preferably rounded transition edges 44 into the belt strap running surface 17. In FIG. 10, the groove depth r is 1.0 mm, while the longitudinal rib width I is 2.0 mm. The groove width c in FIG. 10 is 2.5 mm. FIG. 10 results in a total of 47 longitudinal ribs between the two tread edges 39.

Figure 11A:
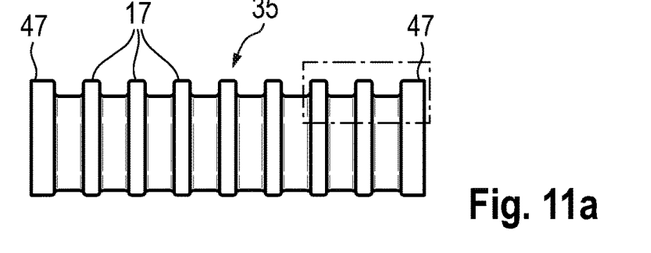
Figure 11B:
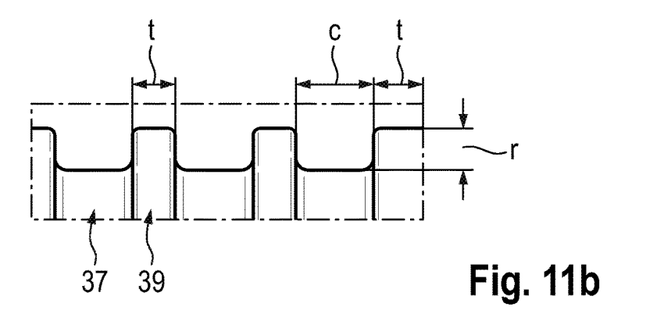

In the embodiment shown in FIG. 11, the groove depth r is 2.0 mm, while the longitudinal rib width I is 2.0 mm. The groove width c in FIG. 11 is 3.0 mm. In this way, between the two tread edges 47, there are a total of seven longitudinal ribs 39 that are spaced apart from each other.

Figure 12A:
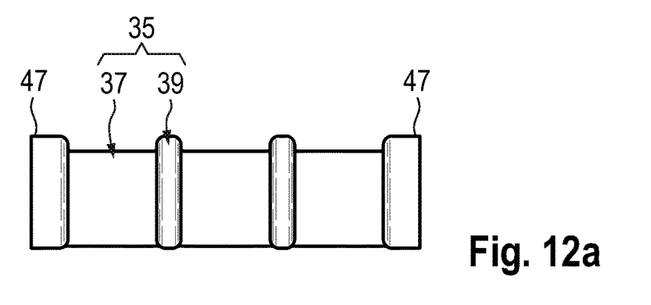
Figure 12B:
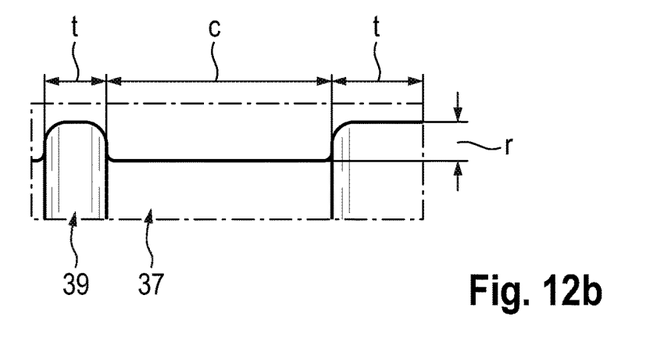

FIG. 12 shows another embodiment in which the groove depth r is 1.8 mm, while the rib width t is 3.0 mm and a groove width c is 11.0 mm. In this way, there are a total of two longitudinal ribs 39 between the two tread edges 47.

Figure 13:
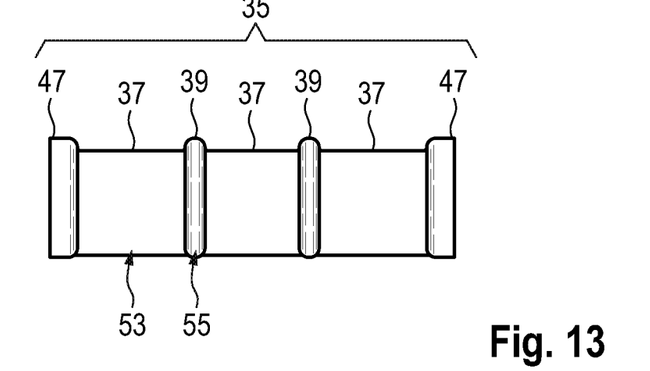

In FIG. 13, the belt fitting 7 is constructed of a metal body 53 and a plastic overmolding 55. The belt strap running surface 17 is also assigned a surface contour 35 which is realized as a ribbed structure. In FIG. 13, the grooved bottoms 41 of the longitudinal grooves 37 are each provided by the metal body 53 in order to reduce a surface roughness of the grooved bottoms 41. In contrast, the longitudinal ribs 39 are made of plastic material, which has an increased surface roughness.

Figure 14:
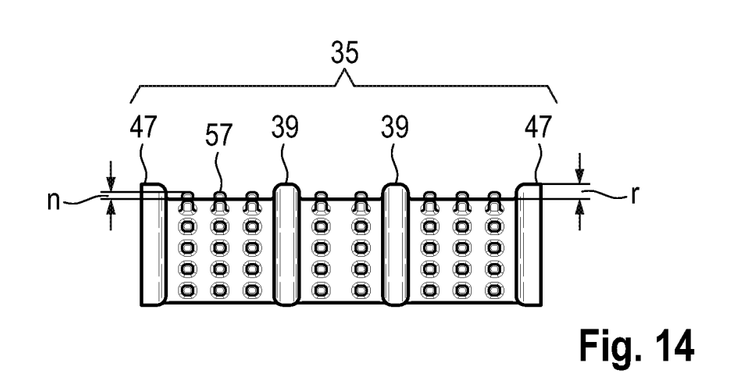

In FIG. 14, the surface contour 35 is also realized as a groove structure, in which nubs 57 are arranged in the grooved bottoms 41. These project from the groove bottoms 41 by a nub height n. The nub height n in FIG. 14 is smaller than the groove depth r.

Figure 15:
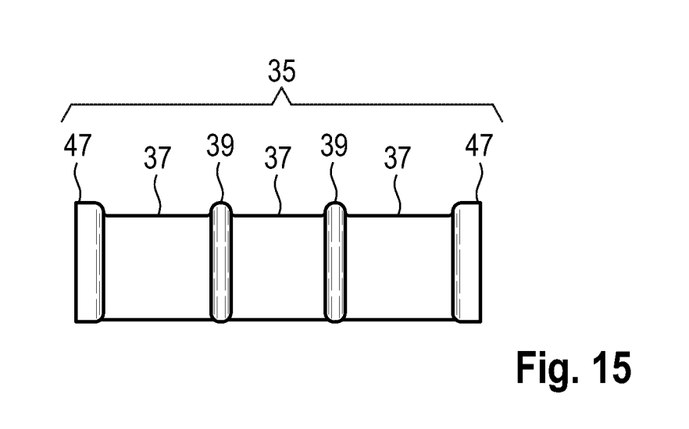

In FIG. 15, the grooved bottoms 41 of the ribbed structure shown are provided by rubber, caoutchouc or elastomers, whereby the grooved bottoms 41 have an increased coefficient of friction as compared to the coefficient of friction of the belt strap running surface 17. In this way, under loading conditions, an increased adhesive friction between the belt strap and the grooved bottoms 41 is provided to hold the belt strap in position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A belt fitting for a safety belt device, the belt fitting comprising:
   a base section that has a belt eyelet with a belt strap running surface, a belt eyelet edge that opposes the belt strap running surface and lateral belt eyelet corner regions, wherein each side of the belt strap running surface, in a belt strap transverse direction, transitions into the belt eyelet edge via a respective one of the lateral belt eyelet corner regions, and wherein the belt strap running surface is in sliding contact with a belt strap guided through the belt eyelet when the safety belt device is being worn;
   a latch plate projecting from the base section;
   a displacement body formed on the belt eyelet edge, wherein the displacement body reduces a gap width of the belt eyelet, and when viewed in the belt strap transverse direction, each side of the displacement body is spaced apart from a respective one of the lateral belt eyelet corner regions via a belt strap free space, such that two belt strap free spaces are provided,
   wherein the belt strap running surface has a surface contour that provides stable transverse guidance of the belt strap in the belt eyelet under loading conditions, which counteracts a transverse load component acting on the belt strap, and
   wherein the surface contour of the belt strap running surface, as viewed in the belt strap transverse direction, is curved.

2. The belt fitting according to claim 1, wherein, between the belt strap running surface and the displacement body, a slot-shaped belt strap guide gap with a reduced passage cross-section is provided, wherein in the belt strap transverse direction, each side of the belt strip guide gap transitions into a respective one of the two belt strap free spaces, and wherein each of the two belt strap free spaces has a profile height from the belt strap guide gap to the belt eyelet edge.

3. The belt fitting according to claim 1, wherein the surface contour of the belt strap running surface, as viewed in the belt strap transverse direction, is concave, and wherein the concave surface contour in the belt strap transverse direction has a center contour bottom and two side contour flanks that rise up to a tread edge, and wherein the contour bottom is recessed with respect to the tread edge by a contour depth.

4. The belt fitting according to claim 1, wherein the surface contour of the belt strap running surface, as viewed in the belt strap transverse direction, is convex, and wherein the convex surface contour in the belt strap transverse direction has a center contour vertex and two side contour flanks that taper by a vertex height to a tread edge.

5. The belt fitting according to claim 1, wherein the belt strap running surface is divided into a front belt strap outlet formed on the front of the belt fitting and into a rear belt strap outlet formed on the back of the belt fitting, which transition into each other on a rounded web surface.

6. The belt fitting according to claim 1, wherein the surface contour of the belt strap running surface has a wave profile with a sinusoidal course in the belt strap transverse direction, in which the wave troughs are recessed by an amplitude height from the wave crests, and wherein the amplitude height is in a range of 0.5 mm to 1.0 mm and/or the number of wave crests over the tread width is in a range of 6 to 23, and/or the wavelength is in a range of 2.0 mm to 6.9 mm.

7. The belt fitting according to claim 1, wherein the surface contour of the belt strap running surface has a grooved profile in which longitudinal grooves and longitudinal ribs are incorporated in the belt strap running surface, each of the longitudinal grooves being spaced apart in the belt strap transverse direction by a respective one of the longitudinal ribs, and wherein each longitudinal groove has a groove bottom recessed from the belt strap running surface by a groove depth, and wherein the groove depth is in a range of 1.0 mm to 2.0 mm, a longitudinal rib width is in a range of 2.0 mm to 4.5 mm, and/or a longitudinal groove width is in a range of 2.5 mm to 11 mm.

8. The belt fitting according to claim 7, wherein the belt fitting is composed of at least one metal body and a plastic overmolding, and wherein the groove bottom of each of the longitudinal grooves of the groove profile of the metal body is provided to reduce a surface roughness of the grooved bottom, while each of the longitudinal ribs are formed of plastic material.

9. The belt fitting according to claim 7, wherein the groove bottom of each of the longitudinal grooves is smoothly formed or is formed with nubs projecting by a nub height from the groove bottom, the nub height being smaller than the groove depth.

10. The belt fitting according to claim 7, wherein the groove bottom of each of the longitudinal grooves has a coefficient of friction greater than that of each of the longitudinal ribs.

11. The belt fitting according to claim 7, wherein the groove bottom of each longitudinal groove transitions into each adjacent longitudinal rib by linear edges or rounded edges.

12. The belt fitting according to claim 7, wherein the groove bottom of each longitudinal groove is linear.

13. The belt fitting according to claim 1, wherein the surface contour of the belt strap running surface has a grooved profile in which longitudinal grooves and longitudinal ribs are incorporated in the belt strap running surface, each of the longitudinal grooves being spaced apart in the belt strap transverse direction by a respective one of the longitudinal ribs, and wherein each longitudinal groove has a groove bottom recessed from the belt strap running surface by a groove depth, from which side flanks rise up and transition into the belt strap running surface on rounded transition edges, and wherein the groove depth is in a range of 1.0 mm to 2.0 mm, a longitudinal rib width is in a range of 2.0 mm to 4.5 mm, and/or a longitudinal groove width is in a range of 2.5 mm to 11 mm.

14. The belt fitting according to claim 1, wherein the surface contour of the belt strap running surface, as viewed in the belt strap transverse direction, is concave or is convex.

15. The belt fitting according to claim 1, wherein the surface contour has a grooved profile or a wave profile.

* * * * *